United States Patent
Roach et al.

(10) Patent No.: US 10,519,863 B2
(45) Date of Patent: Dec. 31, 2019

(54) TURBINE ENGINE CASE ATTACHMENT AND A METHOD OF USING THE SAME

(71) Applicant: United Technologies Corporation, Farmington, CT (US)

(72) Inventors: James T. Roach, Vernon, CT (US); Darin S. Lussier, Guilford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 751 days.

(21) Appl. No.: 14/874,049

(22) Filed: Oct. 2, 2015

(65) Prior Publication Data

US 2016/0201510 A1 Jul. 14, 2016

Related U.S. Application Data (60) Provisional application No. 62/087,474, filed on Dec. 4, 2014.

(51) Int. Cl.
*B64D 27/26* (2006.01)
*F02C 7/20* (2006.01)
*F01D 25/28* (2006.01)
*F01D 21/04* (2006.01)

(52) U.S. Cl.
CPC ............ *F02C 7/20* (2013.01); *B64D 27/26* (2013.01); *F01D 21/045* (2013.01); *F01D 25/28* (2013.01); *F05D 2240/90* (2013.01); *F05D 2260/311* (2013.01); *Y02T 50/44* (2013.01); *Y02T 50/671* (2013.01)

(58) Field of Classification Search
CPC ........ B64D 2027/26–268; B64D 29/06; F02C 7/32; F02C 7/20; F02K 3/06
See application file for complete search history.

(56) References Cited

U.S. PATENT DOCUMENTS

| | | | | |
|---|---|---|---|---|
| 3,465,524 A | * | 9/1969 | Petrie | F02K 3/06 60/226.2 |
| 3,489,338 A | * | 1/1970 | Davies | F01D 7/00 416/157 R |
| 3,526,092 A | * | 9/1970 | Steel | F01D 25/16 415/60 |
| 4,044,973 A | * | 8/1977 | Moorehead | B64D 27/20 244/54 |
| 4,344,282 A | * | 8/1982 | Anders | F01D 17/105 60/226.1 |
| 4,384,453 A | * | 5/1983 | Tudor | F01D 25/24 244/54 |
| 5,484,105 A | * | 1/1996 | Ausdenmoore | B64D 33/04 239/127.3 |
| 8,016,543 B2 | | 9/2011 | Braley et al. | |

(Continued)

*Primary Examiner* — Gerald L Sung
*Assistant Examiner* — Rene D Ford
(74) *Attorney, Agent, or Firm* — Cantor Colburn LLP (57) ABSTRACT

The present disclosure relates generally to a turbine engine case assembly, the turbine engine case assembly including a fan case including an outer frame encircling an axis, the outer frame including an outer frame exterior surface and an outer frame interior surface, at least two mounts disposed on the outer frame exterior surface, wherein the at least two mounts are circumferentially spaced along the outer frame exterior surface, and a compliant attachment device operably coupled to the at least two mounts.

5 Claims, 6 Drawing Sheets

(56) References Cited

U.S. PATENT DOCUMENTS

| | | |
|---|---|---|
| 8,206,102 B2 | 6/2012 | Moon |
| 8,596,965 B2 | 12/2013 | Merry et al. |
| 8,596,972 B2 | 12/2013 | Moon |
| 8,662,819 B2 | 3/2014 | Beaulieu |
| 8,753,075 B2 | 6/2014 | Rice et al. |
| 2014/0084129 A1 | 3/2014 | Sandy |
| 2014/0294581 A1* | 10/2014 | Rivers .................. F01D 25/24 415/214.1 |

* cited by examiner

TURBINE ENGINE CASE ATTACHMENT AND A METHOD OF USING THE SAME

CROSS REFERENCE TO RELATED APPLICATIONS

This application claims the benefit of U.S. Provisional Patent Application Ser. No. 62/087,474 filed Dec. 4, 2014, the entire contents of which are incorporated herein by reference thereto.

STATEMENT REGARDING FEDERALLY SPONSORED RESEARCH OR DEVELOPMENT

This invention was made with support of the government by the United States Air Force under contract number FA8650-09-D-2923-D00021. The government therefore has certain rights in this invention.

TECHNICAL FIELD OF THE DISCLOSED EMBODIMENTS

The present disclosure is generally related to turbine engine cases, in particular to a turbine engine attachment and a method of using the same.

BACKGROUND OF THE DISCLOSED EMBODIMENTS

Stationary struts within a gas turbine engine function to support the inner portion, or core. Additionally, the struts may function as an airfoil. These struts, may be radially disposed between an inner hub and an outer casing, and may be spaced around the circumference of the rotor section in either a symmetrical or an asymmetrical arrangement. The strut design provides the structure with the stiffness required to maintain fit, form, and function against loads, including but not limited to, those caused by maneuvers, fan blade out, impinging gas loads, surge, and may provide the ability to withstand both hard and soft body impact.

Loads are generally transmitted through the hub-strut-case structure through the mounts to the airframe via links or similar features. Generally, in a situation where the loads are excessively large (e.g., when the engine has suffered a fan blade-out event), the attachment links transmit excessively large dynamic loads into the aircraft. As a result, the system may experience a flight safety event, such as, the aircraft must be taken out of service in order to repair and/or replace the case and other necessary components.

Improvements in turbine case attachments are therefore needed in the art.

SUMMARY OF THE DISCLOSED EMBODIMENTS

In one aspect, a turbine engine case assembly is provided. The turbine engine case assembly includes a fan case including an outer frame encircling the axis. The outer frame includes an outer frame exterior surface and an outer frame interior surface. At least two mounts, circumferentially spaced along the outer frame exterior surface, are disposed on the outer frame exterior surface. In one embodiment, the turbine engine case assembly further includes a center frame encircling the axis A, wherein the center frame is positioned radially inward from the outer frame, and a plurality of struts, each coupled at a strut first end to the center frame and at a strut second end to the outer frame interior surface.

The turbine engine case assembly further includes a compliant attachment device operably coupled to the case at the at least two mounts. In one embodiment, the compliant attachment device is a spring. In one embodiment, the spring is a leaf spring. In one embodiment, the compliant attachment device is frangible.

In one aspect, a method for reducing load transfer on a turbine engine case is provided. The method includes the step of securing a compliant attachment device to a turbine engine case to produce a turbine engine case assembly. In one embodiment, securing a compliant attachment device to a turbine engine case includes coupling the compliant attachment device between the at least two mounts disposed on the outer frame exterior surface. The method further includes the step of securing the turbine engine case to an air frame.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
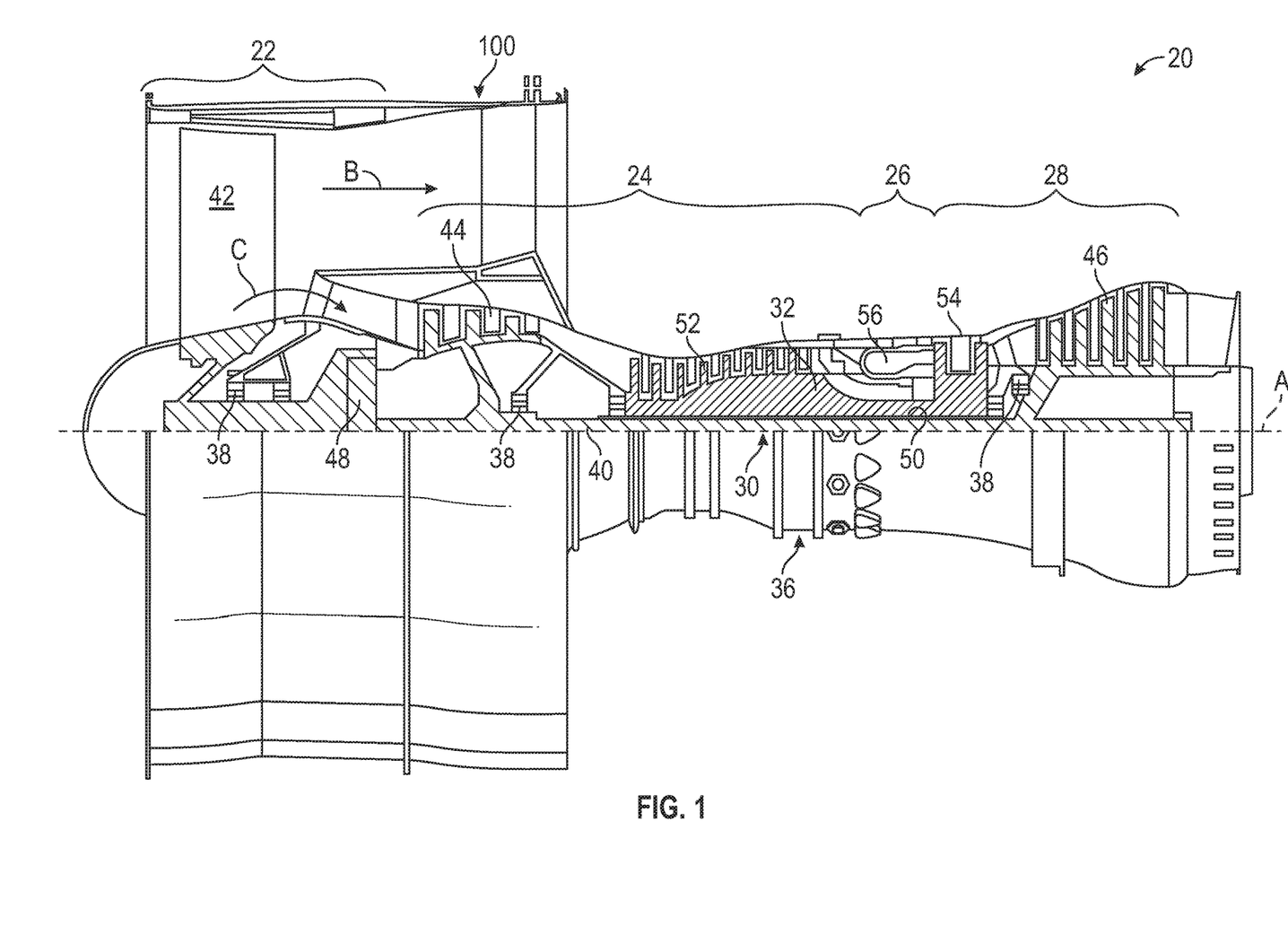
FIG. 1 is a sectional view of one example of a gas turbine engine in which the presently disclosed embodiments may be used.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
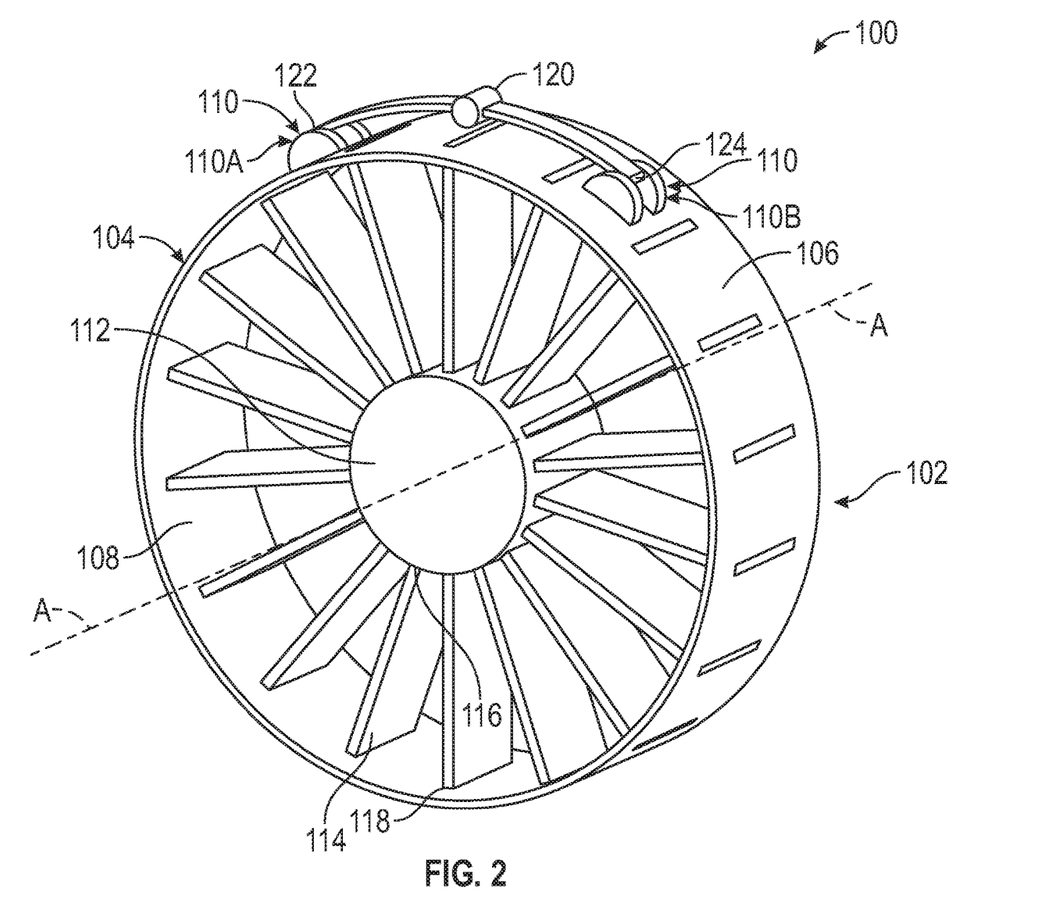
FIG. 2 is a perspective view of a turbine engine case assembly used in a gas turbine engine in one embodiment.

FIG. 2 illustrates a turbine engine case assembly, generally indicated at 100. The turbine engine case assembly 100, depicted in FIG. 2, is configured to be disposed about the fan section 22. For example, the turbine engine case assembly 100, shown in FIG. 1, is aft of the fan section 22. It will be appreciated that other turbine engine case assemblies 100 may be disposed about other sections of the gas turbine engine 20, for example the compressor section 24 to name one non-limiting example. The turbine engine case assembly 100 includes a fan case 102 including an outer frame 104 encircling the axis A. The outer frame 104 includes an outer frame exterior surface 106 and an outer frame interior surface 108. At least two mounts 110, configured to attach the turbine engine case assembly 100 to an air frame 126 (see FIG. 3), are disposed on the outer frame exterior surface 106. The at least two mounts 110 are circumferentially spaced along the outer frame exterior surface 106. It will be appreciated that more than two mounts 110 may be circumferentially spaced along the outer frame exterior surface 106. In one embodiment, the turbine engine case assembly 100 further includes a center frame 112 encircling the axis A, wherein the center frame 112 is positioned radially inward from the outer frame 104, and a plurality of struts 114, each coupled at a strut first end 116 to the center frame 112, and at a strut second end 118 to the outer frame interior surface 108.

The turbine engine case assembly 100 further includes a compliant attachment device 120. The compliant attachment device 120 is configured to reduce the loads transmitted to the supporting aircraft during an extreme load condition, for example, a fan blade out or ultimate maneuver, to name a couple of non-limiting examples, by dissipating some of the load in the compliant attachment device 120 before it is transferred to the airframe 126. The compliant attachment device 120 is operably coupled to the case at the at least two mounts 110 in one embodiment. For example, a compliant attachment device first end 122 may be operably coupled to the mount 110A, and a compliant attachment device second end 124 may be operably coupled to the mount 110B. It will be appreciated that the compliant attachment device 120 may be coupled to each of the mounts 110 by any suitable means, for example, a nut and bolt to name one non-limiting example.

Figure 3:
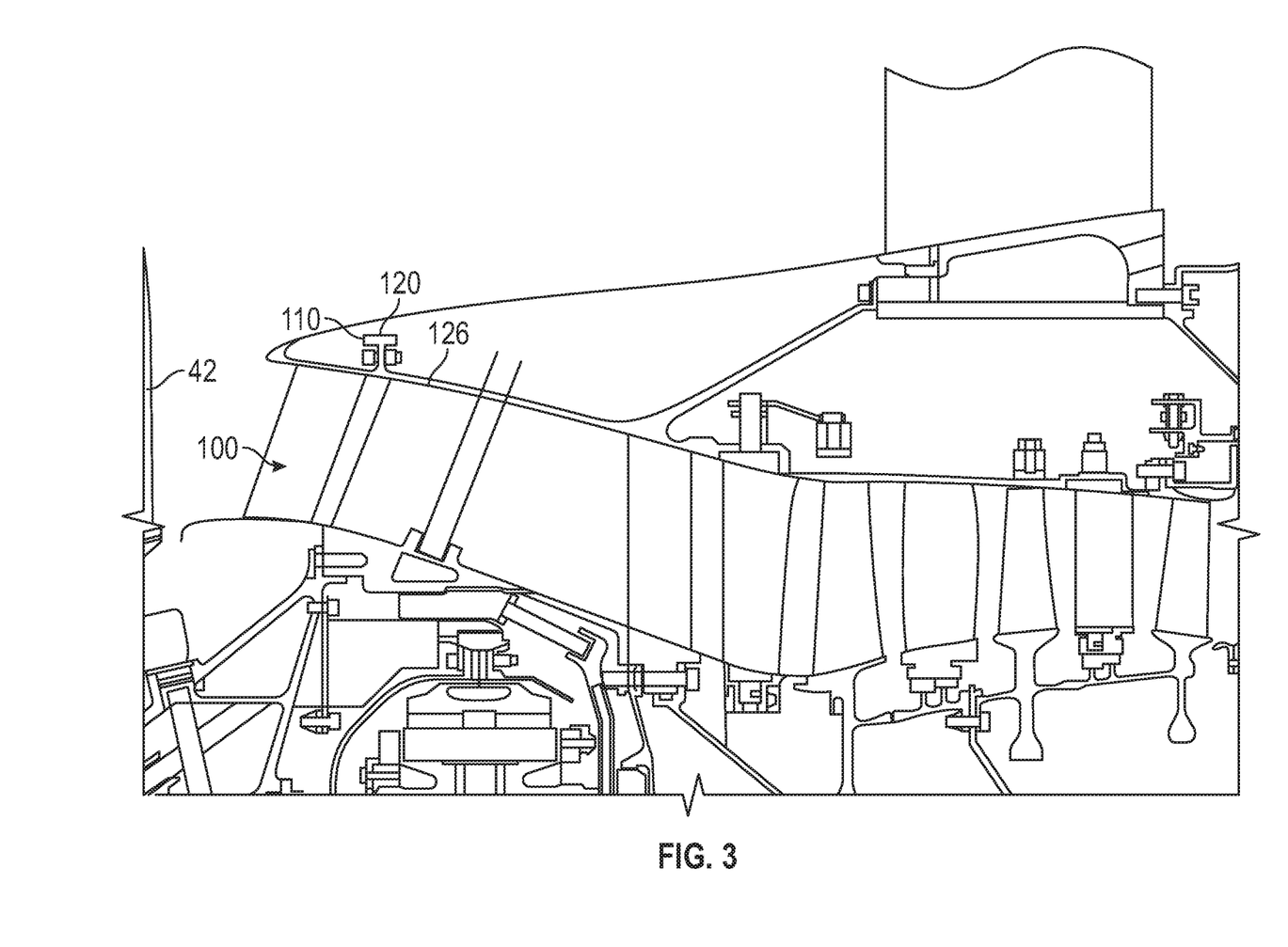
FIG. 3 is a sectional view of one example of a gas turbine engine and a turbine engine case assembly in one embodiment.
Figure 4:
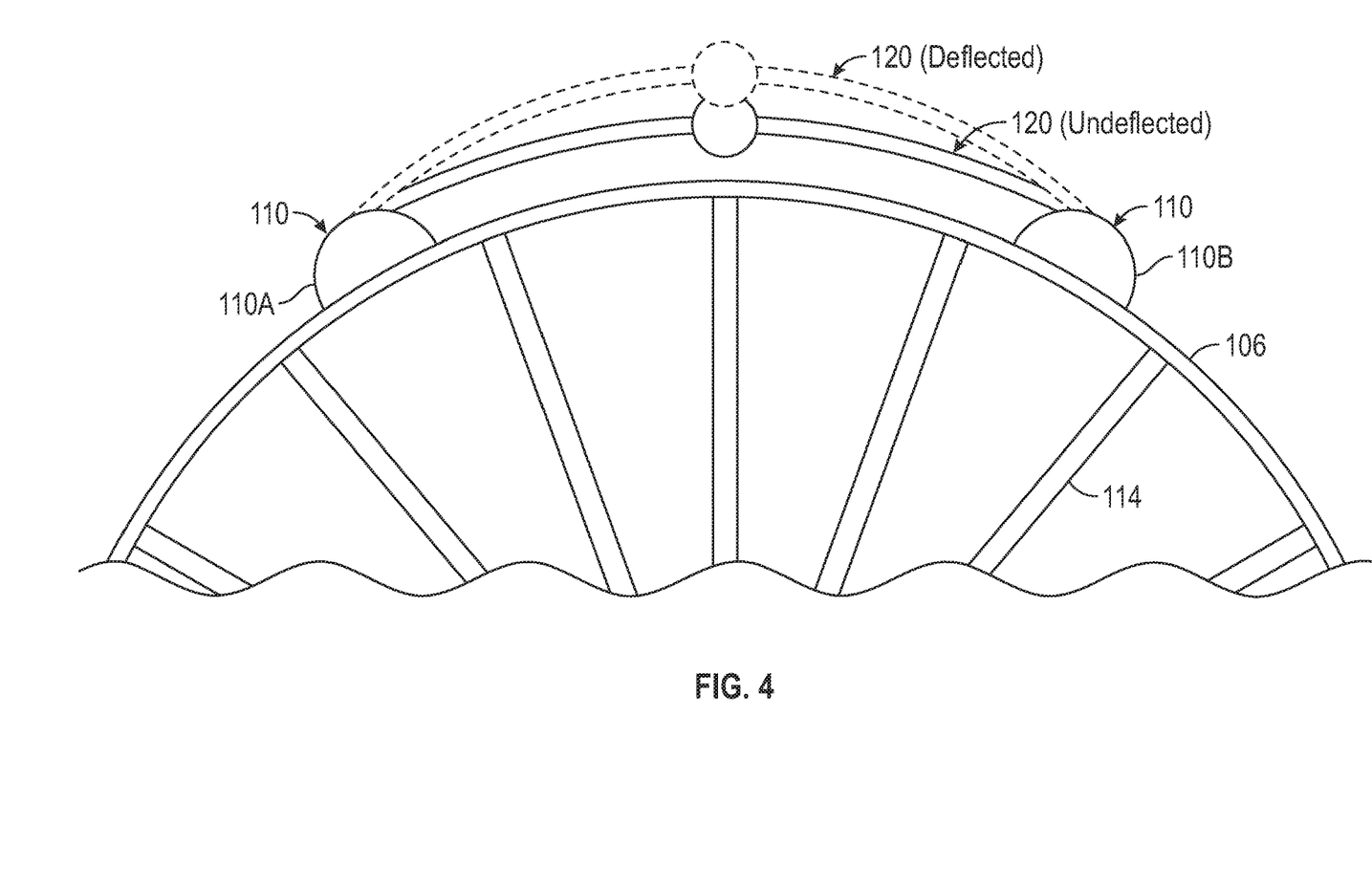
FIG. 4 is a front view of a turbine engine case assembly used in a gas turbine engine in one embodiment.
Figure 5:
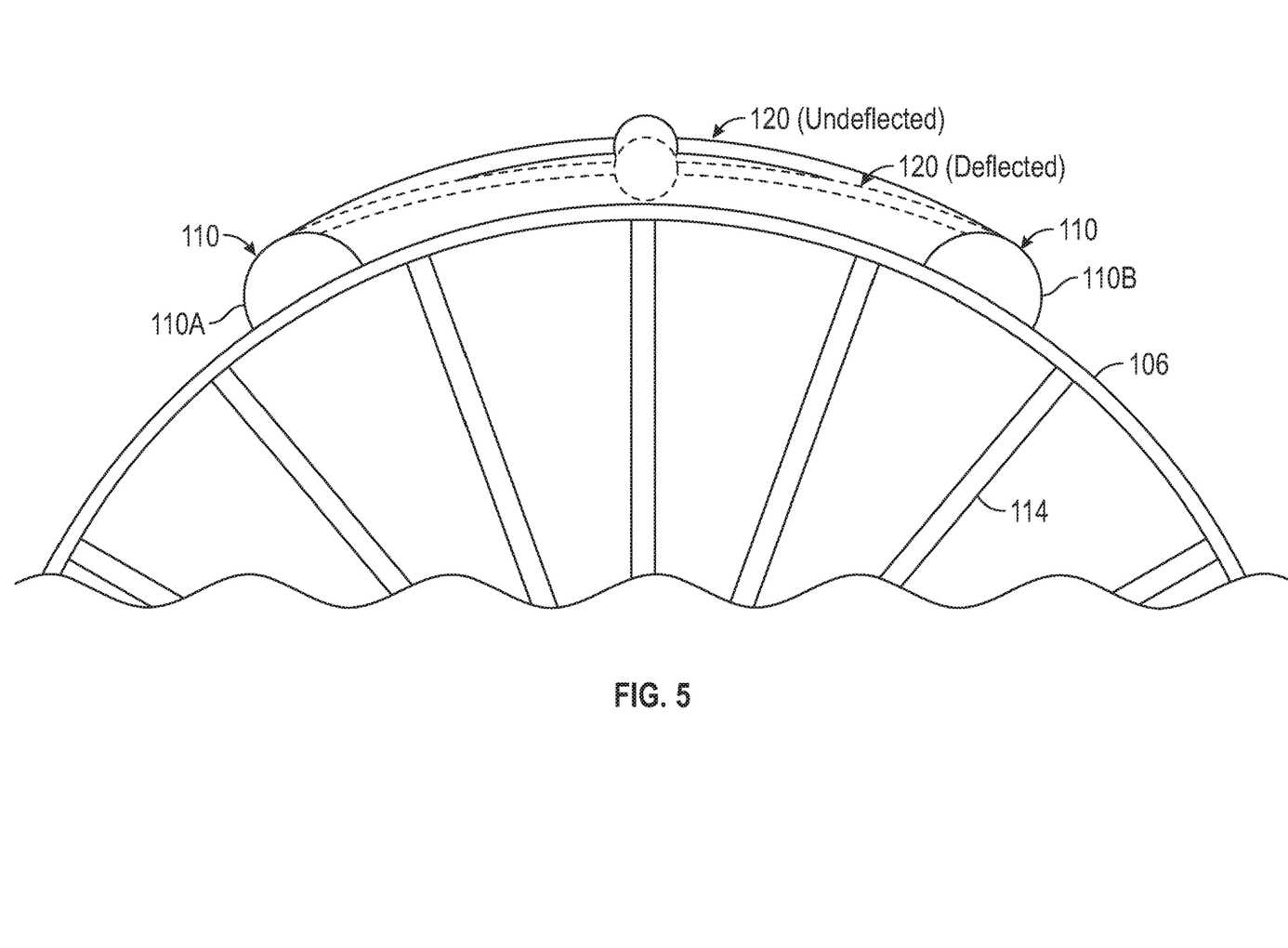
FIG. 5 is a front view of a turbine engine case assembly used in a gas turbine engine in one embodiment.
Figure 6:
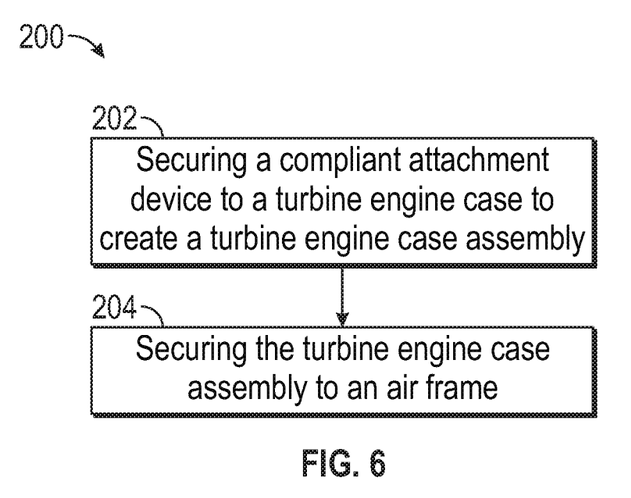
FIG. 6 is a schematic flow diagram of an embodiment of a method of reducing load transfer on a turbine engine case in one embodiment.

In one embodiment, the compliant attachment device 120 is a spring. In one embodiment, the spring includes a leaf spring. For example, as shown in FIGS. 3-5, the turbine engine case assembly 100 is a fan inlet case, and during extreme load conditions, the compliant attachment device 120 deflects in an outward and/or inward direction to provide a dampening effect to reduce the resonance of the turbine engine case assembly 100 and, hence, the magnitude of the load transferred to the airframe 126. In one embodiment, the compliant attachment device 120 is frangible. In this embodiment, during extreme load conditions, the compliant attachment device 120 is capable of breaking, in whole or in part, to reduce the load transferred from the compliant attachment device 120 to the supporting aircraft. In other embodiments, the compliant attachment device 120 may be any device operative to dissipate some of the load in the compliant attachment device 120 before it is transferred to the airframe 126.

FIG. 5 illustrates a method, generally indicated at 200, for reducing load transfer on a turbine engine case. The method 200 includes the step 202 of securing a compliant attachment device 120 to a turbine engine case 102 to produce a turbine engine case assembly 100. In one embodiment, securing a compliant attachment device 120 to a turbine engine case 102 includes coupling the compliant attachment device 120 between the at least two mounts 110 disposed on the outer frame exterior surface 106.

The method further includes the step 204 of securing the turbine engine case 102 to a portion of an airframe 126. For example, as shown in FIG. 3, the turbine engine case assembly 100 may be mounted to a portion of the airframe 126 using the at least two mounts 110 disposed on the outer frame exterior surface 106.

It will be appreciated that as the compliant attachment device 120 may be composed of a lightweight material to reduce the overall weight of the aircraft. It will also be appreciated that the compliant attachment device 120 may be operably coupled to the turbine engine case 102 to provide compliance by deflecting the impact load from an airframe to a localized component.

While the disclosure has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A turbine engine case assembly comprising:
   a fan case including an outer frame encircling an axis, the outer frame including an outer frame exterior surface and an outer frame interior surface;
   at least two mounts disposed on the outer frame exterior surface, wherein the at least two mounts are circumferentially spaced along the outer frame exterior surface;
   a compliant attachment device directly coupled to the at least two mounts, the entire compliant attachment device being compliant, the compliant attachment device being a leaf spring extending longitudinally in a circumferential direction;
   a center frame encircling the axis, wherein the center frame is positioned radially inward from the outer frame; and
   a plurality of struts, each coupled at a first end to the center frame, and at a second end to the outer frame interior surface.

2. The turbine engine case assembly of claim 1, wherein the compliant attachment device is frangible.

3. A gas turbine engine comprising
   a fan section;
   a low pressure compressor;
   an airframe; and
   a turbine engine case assembly disposed aft the fan section;
   wherein the turbine engine case assembly comprises:
      an outer frame encircling an axis, the outer frame including an outer frame exterior surface and an outer frame interior surface;
      at least two mounts operably coupled to the outer frame exterior surface, wherein the at least two mounts are circumferentially spaced along the outer frame surface; and
      a compliant attachment device operably coupled to the at least two mounts, the entire compliant attachment device being compliant, the compliant attachment device being a leaf spring extending longitudinally in a circumferential direction, and the compliant attachment device dissipating some of a load before the load is transferred to the airframe.

4. The gas turbine engine of claim 3, wherein the compliant attachment device is frangible.

5. The gas turbine engine of claim 3, wherein the turbine engine case assembly further comprises:
   a center frame encircling the axis, wherein the center frame is positioned radially inward from the outer frame; and
   a plurality of struts, each coupled at a first end to the center frame, and at a second end to the outer frame interior surface.

\* \* \* \* \*

UNITED STATES PATENT AND TRADEMARK OFFICE
CERTIFICATE OF CORRECTION

| | | |
|---|---|---|
| PATENT NO. | : 10,519,863 B2 | Page 1 of 1 |
| APPLICATION NO. | : 14/874049 | |
| DATED | : December 31, 2019 | |
| INVENTOR(S) | : James T. Roach and Darin S. Lussier | |

It is certified that error appears in the above-identified patent and that said Letters Patent is hereby corrected as shown below:

In the Specification

In Column 5, Line 12 please remove "FIG. 5" and replace with --FIG. 6--

Signed and Sealed this
Nineteenth Day of May, 2020

Andrei Iancu
*Director of the United States Patent and Trademark Office*